(12) United States Patent
Jordan

(10) Patent No.: US 7,953,425 B2
(45) Date of Patent: May 31, 2011

(54) UNIVERSAL EVENT/DATA RECORDER SYSTEM

(75) Inventor: Lawrence B. Jordan, Bolingbrook, IL (US)

(73) Assignee: Wi-Tronix, LLC, Bolingbrook, IL (US)

( * ) Notice: Subject to any disclaimer, the term of this patent is extended or adjusted under 35 U.S.C. 154(b) by 415 days.

(21) Appl. No.: 11/464,095

(22) Filed: Aug. 11, 2006

(65) Prior Publication Data

US 2007/0076312 A1 Apr. 5, 2007

Related U.S. Application Data

(60) Provisional application No. 60/707,448, filed on Aug. 11, 2005.

(51) Int. Cl.
*H04B 7/00* (2006.01)
*H04B 1/38* (2006.01)
*H04W 4/00* (2009.01)

(52) U.S. Cl. .................. 455/466; 455/557; 455/431

(58) Field of Classification Search ........ 703/8; 340/681; 455/525, 552.1, 431, 66; 719/2; 701/206, 701/9

See application file for complete search history.

(56) References Cited

U.S. PATENT DOCUMENTS

| | | | | |
|---|---|---|---|---|
| 6,148,179 A | * | 11/2000 | Wright et al. | 455/66.1 |
| 6,324,659 B1 | * | 11/2001 | Pierro | 714/48 |
| 6,629,183 B1 | * | 9/2003 | Gortz et al. | 710/305 |
| 2003/0222981 A1 | * | 12/2003 | Kisak et al. | 348/148 |
| 2004/0093196 A1 | | 5/2004 | Hawthorne et al. | |

OTHER PUBLICATIONS

International Search Report dated Nov. 5, 2007.

* cited by examiner

*Primary Examiner* — Lester Kincaid
*Assistant Examiner* — Kuo Woo
(74) *Attorney, Agent, or Firm* — Howard B. Rockman

(57) ABSTRACT

A universal event/data recorder system provides a common bridge between various event/data recorders found on mobile assets. The universal event/data recorder system includes an onboard segment that is capable of interfacing with any manufacturer's event/data recorder device. Additionally, the universal event/data recorder system also includes a remote segment for accessing, analyzing and reviewing data collected from any of a plurality of event/data recorders. The universal event/data recorder system may allow accessing data from various event/data recorders using any of a number of communication means including the Internet and a wireless communication network.

23 Claims, 8 Drawing Sheets

UNIVERSAL EVENT/DATA RECORDER SYSTEM

CROSS-REFERENCE TO RELATED APPLICATIONS

This application is based on and claims the benefit of U.S. Provisional Application No. 60/707,448, filed on Aug. 11, 2005 and entitled "Universal Event/Data Recorder System," which is incorporated herein by reference in its entirety.

FIELD

This patent generally relates to equipments used in high value assets and particularly, it relates to event/data recorder systems used in high value assets.

BACKGROUND

High value mobile assets such as locomotives, aircrafts, mass transit systems, mining equipment, transportable medical equipment, and marine vessels typically employ onboard event/data recorder "black box" systems. These event/data recorders log a variety of system parameters used for incident investigation, crew performance evaluation, fuel efficiency analysis, maintenance planning, and predictive diagnostics. Recorded data may include such parameters as speed, distance traveled, location, fuel level, engine revolution per minute (RPM), fluid levels, operator controls, pressures, and ambient conditions. In addition to the basic event and operational data, video and audio event/data recording capabilities are also deployed on many of these same mobile assets.

The prevalence of mobile-asset recording, logging, and diagnosing systems has created an environment where an end user may often find multiple event/data recorder manufacturers as well as models across a fleet of mobile assets. In fact, many mobile assets combine one original equipment manufacturer's (OEM's) engine diagnostics with another manufacturer's event/data recorder, another vendor's fuel level monitoring, and yet another manufacturer's video and audio recorder. In such a situation, each of these disparate systems requires use of different data access, data download and data analysis tools (typically PC-based software) to locally download and view data, where such tools are often incompatible with each other. After such data is retrieved, the time offset of each device must be determined for manual data synchronization. As one would appreciate, the task of managing the different data access, data download and data analysis tools, custody and analysis of downloaded data, and archival of the downloaded data from a fleet of thousands of mobile assets is extremely cumbersome.

Moreover, managing the one or more of the data access, data download and data analysis processes using wireless tools further increases complexity of such system because each OEM and event/data recorder supplier may have its own wireless implementation that may require separate wireless hardware both onboard the mobile asset and at fixed stations wirelessly linked to onboard systems.

BRIEF DESCRIPTION OF THE DRAWINGS

While the appended claims set forth the features of the present patent with particularity, the patent, together with its objects and advantages, may be best understood from the following detailed description taken in conjunction with the accompanying drawings, of which:

DETAILED DESCRIPTION

Figure 1:
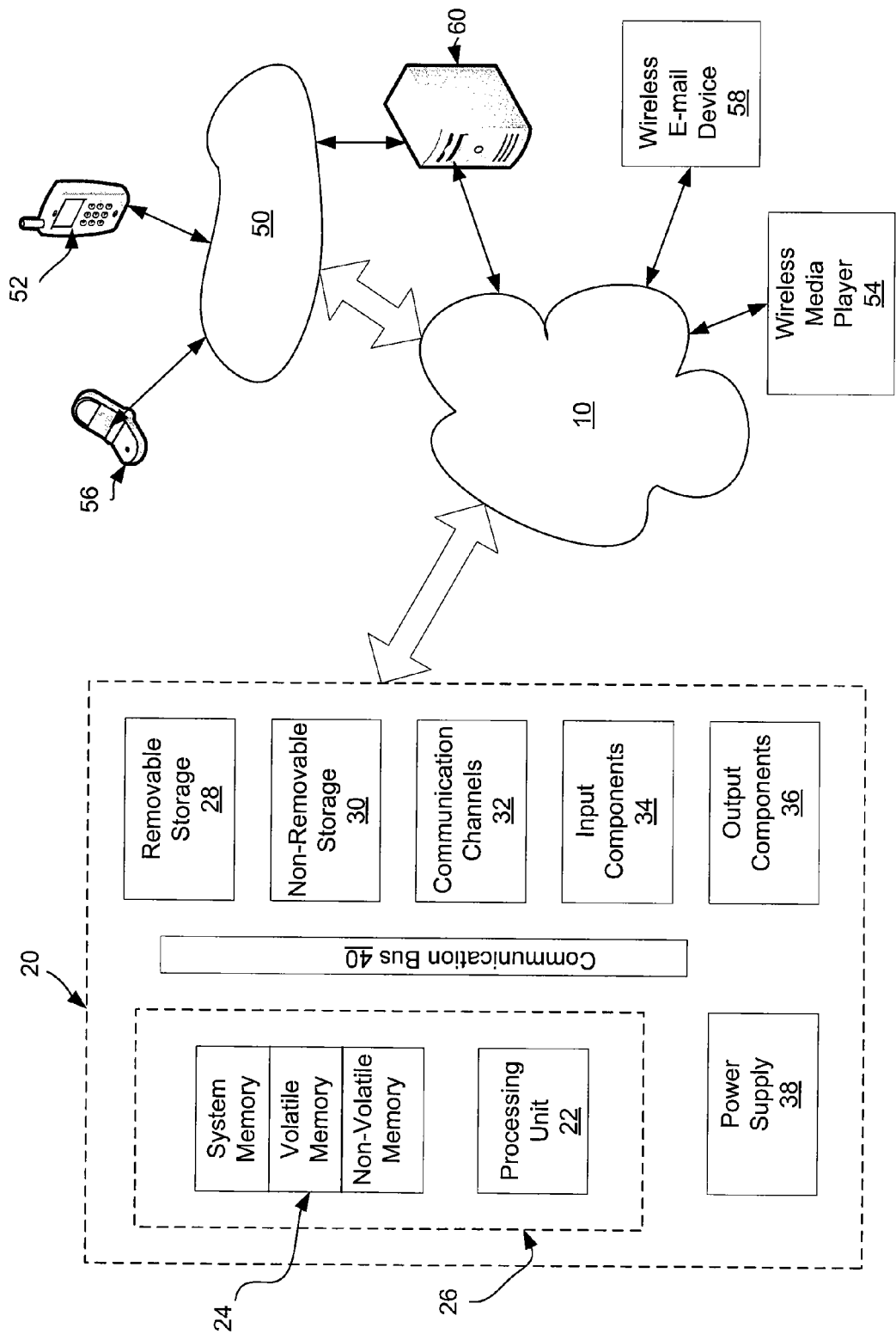
FIG. 1 illustrates an example block diagram of a network that may be used to implement an embodiment of the system and method disclosed herein.

A universal event/data recorder system disclosed herein provides a common bridge between various event/data recorders found on mobile assets. The universal event/data recorder system includes an onboard segment that is capable of interfacing with any manufacturer's event/data recorder device. Additionally, the universal event/data recorder system also includes a remote segment for accessing, analyzing and reviewing data collected from any of a plurality of event/data recorders. The universal event/data recorder system may allow accessing data from various event/data recorders using any of a number of communication means including the Internet and a wireless communication network.

In the description that follows, various components/implementations of event/data recording systems are described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the computing device in a manner well understood by those skilled in the art. The data structures where data are maintained are physical locations of the memory that have particular properties defined by the format of the data. However, while the patent is being described in the foregoing context, it is not meant to be limiting as those of skill in the art will appreciate that several of the acts and operations described hereinafter may also be implemented in hardware.

Turning to the drawings, wherein like reference numerals refer to like elements, the patent is illustrated as being implemented in a suitable networking environment. The following description is based on illustrated embodiments of the patent and should not be taken as limiting the patent with regard to alternative embodiments that are not explicitly described herein.

Network and Computer

FIG. 1 illustrates a block diagram of a network 10 that may be used to implement the system and method described herein. Each node of the network 10 may reside in a device that may have one of many different computer architectures.

For descriptive purposes, FIG. 1 shows a schematic diagram of an exemplary architecture of a computing device 20 usable at any of the various devices connected to the network 10. The architecture portrayed is only one example of a suitable environment and is not intended to suggest any limitation as to the scope of use or functionality of various embodiments described herein. Neither should the computing devices be interpreted as having any dependency or requirement relating to any one or combination of components illustrated in FIG. 1. Each of the various embodiments described herein is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, the computing device 20 typically includes at least one processing unit 22 and memory 24. The memory 24 may be volatile (such as RAM), non-volatile (such as ROM and flash memory), or some combination of the two. This most basic configuration is illustrated in FIG. 1 by the dashed line 26. The computing device 20 may also contain storage media devices 28 and 30 that may have additional features and functionality. For example, the storage media devices 28 and 30 may include additional storage (removable and non-removable) including, but not limited to, PCMCIA cards, magnetic and optical disks, and magnetic tapes. Such additional storage is illustrated in FIG. 1 by the removable storage 28 and the non-removable storage 30.

Computer-storage media may include volatile and non-volatile, removable and non-removable media implemented in any method or technology for storage of information such as computer-readable instructions, data structures, program modules, or other data. Memory 24, removable storage 28, and non-removable storage 30 are all examples of computer-storage media. Computer-storage media include, but are not limited to, RAM, ROM, EEPROM, flash memory, other memory technology, CD-ROM, digital versatile disks, other optical storage, magnetic cassettes, magnetic tapes, magnetic disk storage, other magnetic storage devices, and any other media that can be used to store the desired information and that can be accessed by the computing device.

The computing device 20 may also contain communication channels 32 that allow it to communicate with other devices. Communication channels 32 are examples of communications media. Communications media typically embody computer-readable instructions, data structures, program modules, or other data in a modulated data signal such as a carrier wave or other transport mechanism and include any information-delivery media. The term computer-readable media as used herein includes both storage media and communications media. The computing device 20 may also have input components 34 such as a keyboard, mouse, pen, a voice-input component, and a touch-input device. Output components 36 include screen displays, speakers, printers, and rendering modules (often called "adapters") for driving them. The computing device 20 has a power supply 38. Various components of the computing device may communicate with each other via an internal communications bus 40. All these components are well known in the art and need not be discussed at length here.

The network 10 may also be communicatively connected to one or more of a plurality of other devices and/or to another network. For example, the network 10 is illustrated to be communicatively connected to another network 50 that may be for example, a virtual private network (VPN), a local area network (LAN), a wireless metropolitan area network MAN), etc. Additionally, the network 10 may also be communicatively connected, directly or via another network 50, to a personal data assistant (PDA) 52, a wireless media player 54, a wireless phone 56, a wireless e-mail device 58, a database server 60, etc.

Event/Data Recording Systems

Event/data recorders when applied to locomotives are defined per U.S. Department of Transportation, Federal Railway Administration Code of Federal Regulations (CFR) 49 §229.5G. However, as it would be obvious to one of ordinary skill in the art, the event/data recording system disclosed herein may be used for any other mobile assets such as airplanes, moving equipments, etc.

Figure 2:
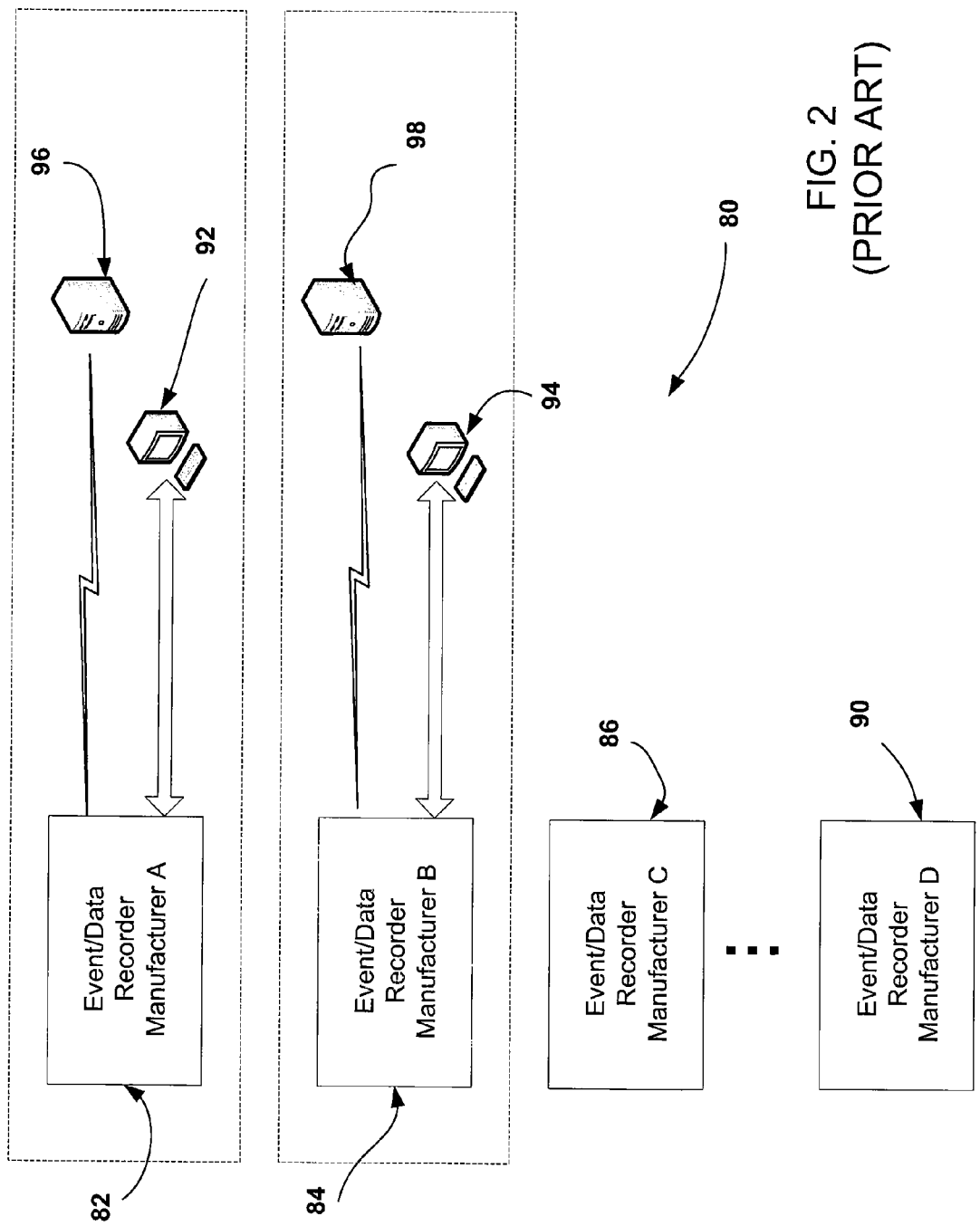
FIG. 2 illustrates prior art implementation of event/data recorder systems.

Referring to FIG. 2, a typical prior art implementation 80 provides a system for managing, and collecting information from, a number of event/data recorders (EDRs) 82-90. Each of the EDRs 82-90 may be designed by different manufacturers and therefore may operate according to a different protocol than the other EDRs. For example, the EDR 82 may be configured to communicate at 19.2 K baud rate, with eight data bits, no parity, one stop bit and no hardware handshaking. On the other hand, the EDR 84 may be configured to communicate at a 57.6 K baud rate, with sixteen data bits, one parity bit, no stop bit and with hardware handshaking, etc.

In the typical prior art implementation 80, a first local downloading client 92 may be configured to communicate with the EDR 82 according to the communication specifications required by the EDR 82, while a second local downloading client 94 may be configured to communicate with the EDR 84 according to the communication specifications required by the EDR 84, and so on. Similarly, separate remote downloading systems 96, 98, etc., may be used for remote downloading of data from the EDRs 82-90. Moreover, because each of these remote downloading systems operate at different communication and data specification levels, it is difficult to use a common communication medium such as the Internet to facilitate integration of the remote data downloading systems 96, 98, etc.

Compared to the prior art systems, generally speaking, the universal event/data recorder system disclosed herein provides a common bridge between the various EDRs found on mobile assets. Such a universal event/data recorder system may be comprised of two major components, namely an onboard segment and a back office segment, which can be used either separately or as a combined system.

As described further in the following figures, the onboard segment may be comprised of a common hardware and/or software system capable of interfacing with any manufacturer's EDR. The onboard segment provides a common data acquisition interface across an entire fleet of mobile assets regardless of the specific systems installed. This common data acquisition interface provides for wired access, wireless access or a combination of both, and supports downloading data from any onboard EDR regardless of manufacturer, model or data format used by such EDR.

The back office segment of such a universal event/data recorder system is comprised of hardware and/or software to store, archive, retrieve, process and present information retrieved from event/data recorders. Additionally, the back office segment may include hardware and/or software in support of remote connectivity to the onboard segment. Furthermore, such a universal event/data recorder system supports both the standard download and viewing tools provided by each event/data recorder and/or a common back office or Internet-based capability to access, synchronize, analyze, view and/or export the data retrieved from any installed event/data recorder on any mobile asset.

Figure 3:
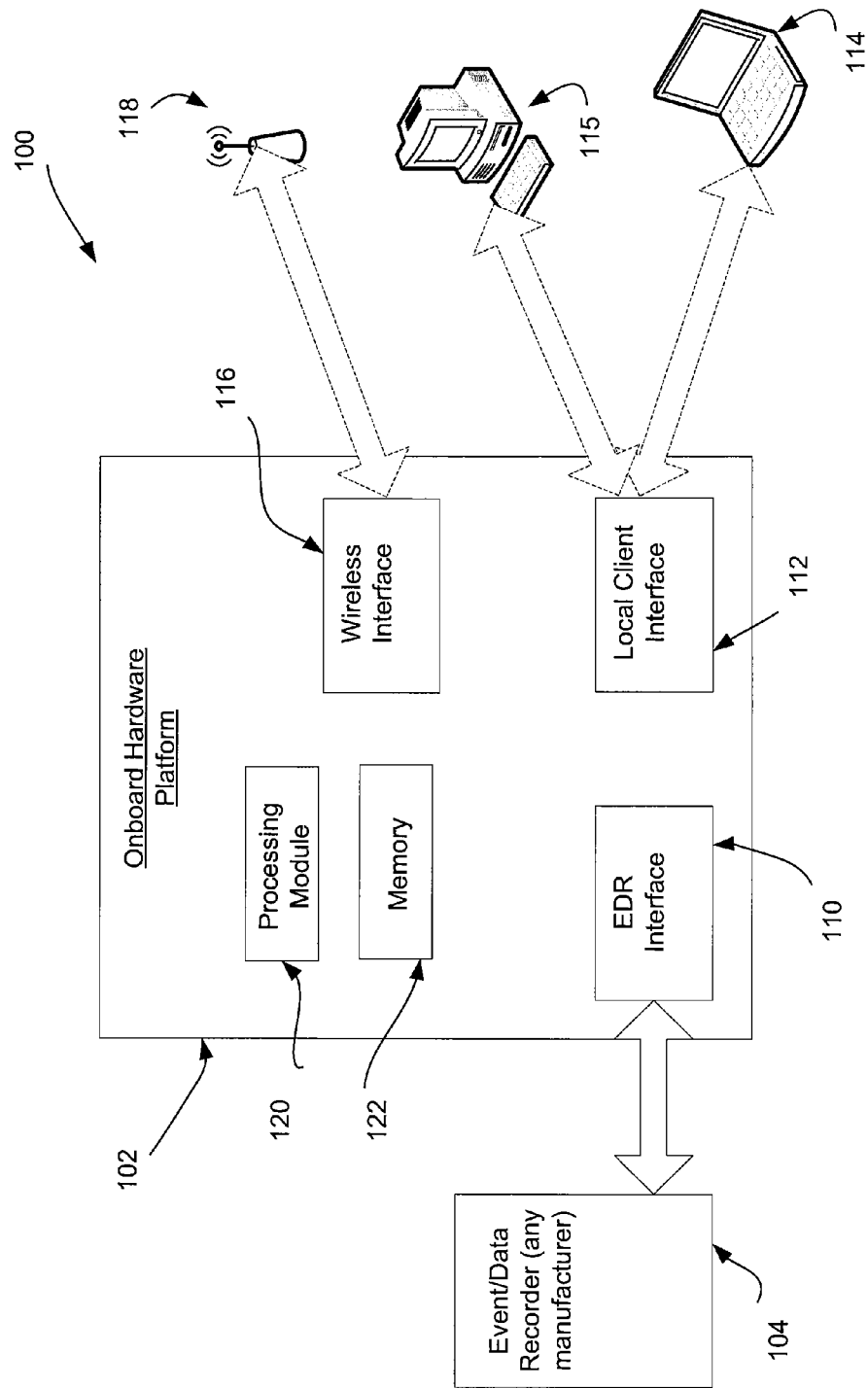
FIG. 3 illustrates an implementation of event/data recorder system using an onboard hardware platform described herein.

FIG. 3 illustrates an implementation of such an event/data recorder system 100. The event/data recorder system 100 is shown to include an onboard hardware platform 102 that may be adapted to communicate with an EDR 104. The onboard hardware platform 102 is designed in a manner so that it may communicate with the EDR 104 irrespective of the manufacturer and/or model of the EDR 104. The onboard hardware platform 102 may have an EDR interface 110 to communicate with EDRs manufactured by any manufacturers such as the EDR 104. Additionally, the onboard hardware platform 102 may also have a local client interface 112 to communicate with any local client 114 such as a laptop computer and a wireless interface 116 that may be used to communicate with a remote client 118 such as a wireless access point, remote network access point, etc.

While in the present implementation the local client 114 is illustrated to be communicating with the local client interface 112 by a wired communication method, in an alternate implementation the local client 114 may communicate with the local client interface 112 in a wireless manner. Alternatively, as illustrated in FIG. 3, the local client interface 112 may be able to communicate with the local client 114 in wired manner and with a remote client 115, such as a desktop computer, in a wireless manner. Moreover, the remote client 115 may also be able to communicate directly with the remote client 118 in a wireless manner. The remote client 115 may be communicating with the local client interface 112 to download bulk EDR files, to upload software to the onboard hardware platform 102, to send remote commands, to query status of various EDRs, etc.

The wireless interface 116 may be adapted to communicate with the wireless access point using, but not limited to, any of the following wireless communication technologies: Bluetooth, Wireless LAN (IEEE 802.11a/b/g), Cellular, Satellite and Private or Public data radio networks. The onboard hardware platform 102 is adapted to communicate over any of these communication technologies using data from the EDR (s) 104 in a number of different formats. The wireless access point may also allow the onboard hardware platform 102 to communicate, using the Internet, or any other network, with one or more remote event/data analysis stations. While the onboard hardware platform 102 is illustrated to have one of each of the interfaces 110, 112 and 116, in an alternate embodiment two or more of each of such interfaces may also be provided. Yet alternatively, only one of the local client interface 112 and the wireless interface 116 may also be provided.

The onboard hardware platform 102 may also include a local processing module 120 that may be used to functionally manage one or more of the interfaces 110, 112 and 116. The onboard hardware platform 102 may also include a memory module 122 that may be used to store one or more instructions from a user, various parameters of the onboard hardware platform 102, various parameters of the interfaces 110, 112 and 116, etc. Moreover, the memory 122 may also be used to store data received from various EDRs and data to be communicated to local clients and/or to remote clients.

The EDR interface 110 is capable of communicating with EDRs or any other onboard system using any of a plurality of communication protocols including, but not limited to, Ethernet, RS232, RS485, RS422, controller area network (CAN) protocol, universal serial bus (USB), etc. Upon initiation, the EDR interface 110 may perform an initiation sequence to identify a particular protocol used by devices and/or EDRs communicating with the EDR interface 110. Such initiation sequence is illustrated in further detail in FIG. 4 below. The initiation sequence may allow the EDR interface 110 to receive communication parameters from various EDRs and to store such communication parameters in the memory 122. Moreover, at any point during its operation, the EDR interface 110 may undertake one of more portions of remote download programs further described in FIGS. 5 and 6 below. The EDR interface 110 is adapted to communicate with EDRs via either wireless or wired communication link. Thus, if an EDR is equipped with a wireless transceiver, such an EDR may be able to communicate with the EDR interface 110 via wireless method.

While the description of the onboard hardware platform 102 is illustrated herein with respect to its communication with only one EDR 104, it is understood that the onboard hardware platform 102 may operate in a similar manner with any number of EDRs or other similar devices.

The EDR interface 110 functions as a common interface between the local client interface 112 and any EDRs such as the EDR 104 and/or between the wireless interface 116 and any EDRs such as the EDR 104. The onboard hardware platform 102 may monitor the local client interface 112 and the wireless interface 116 to determine if any download device, such as a computer, etc., is connected to these interfaces and/or if these interfaces have received any request for data downloaded from EDR 104 or any other on-board devices. Upon detecting presence of such a download device, the onboard hardware platform 102 may interrupt any interaction between the EDR interface 110 and the EDR 104. Subsequently, the onboard hardware platform 102 may enter a pass-through mode in which any commands received from the download device are forwarded to the appropriate EDR. For example, the onboard hardware platform 102 may interrupt any interaction with the EDR 104 upon detecting presence of the local client 114 and enter into a pass-through mode where commands received from the local client 114 are communicated to the EDR 104, while the data received from the EDR 104 is communicated to the local client 114.

Furthermore, the onboard hardware platform 102 may support changing the port speed and/or protocols being executed while in the "pass-though" mode based on the port-speed and/or protocols required by the local client 114 or the remote client 118. Thus, for example, the onboard hardware platform 102 may be communicating with the EDR 104 using a serial communication port that uses the typical 19.2 K baud, 8 data bits, no parity and 1 stop bit with no hardware handshaking. However, the local client 114 may request that the port speed be changed to 57.6 K baud rate using an X-Modem file transfer protocol. In that situation, the onboard hardware platform 102 may listen to the local client 114 while in a pass-through mode for any command being sent from the local client 114 to the EDR 104. The onboard hardware platform 102 may store such commands in the memory 122 or it may process and interpret such commands using the processing module 120. Based on the interpretation of the command, the onboard hardware platform 102 may change the port and/or protocol settings of the local client interface 112.

Subsequently, the command from the local client 114 may be passed through to the EDR 104, allowing the EDR 104 to internally make any port configuration changes as necessary. The EDR 104 may acknowledge any such changes made by the EDR 104 back to the local client 114 confirming that appropriate port and protocol settings have been made. If the appropriate acknowledgements are not received from the EDR 104, the onboard hardware platform 102 may reset the local client interface 112 to its original configuration allowing the local client 114 to reattempt a download from the EDR 104.

Once the onboard hardware platform 102 has successfully initiated the communication between the local client 114 and the EDR 104, the local client 114 may continuously download data from the EDR 104 without any interruption from or interaction with the onboard hardware platform 102. In this situation, the onboard hardware platform 102 may simply monitor the downloading of the data. If the onboard hardware platform 102 notes that there is no downloading activity going on between the local client 114 and the EDR 104, the onboard hardware platform 102 may resume control of the local client interface 112, reset any port and protocol configuration changes that may have been made while in the pass-through mode, and reestablish direct communication with the EDR 104 using the EDR interface 110.

In an alternate embodiment, the download device may be the remote client 118. In such a situation, the onboard hardware platform 102, while operating in a pass-through mode, may listen to the wireless interface 116 for any command being sent from the remote client 118 to the EDR 104. If the onboard hardware platform 102 determines that the remote client 118 is communicating a command to the EDR 104, the onboard hardware platform 102 may store such commands in the memory 122 or it may process and interpret such commands using the processing module 120. Based on the interpretation of the command, the onboard hardware platform 102 may change the port and protocol settings of the wireless interface 116.

Thus, the remote client 118 may download data from the EDR 104 in the same manner as the local client 114 downloads data from the EDR 104 as described above. Note that the remote client 118 may be communicatively connected to wireless devices such as a PDA, a cell-phone, etc., to a network such as the Internet, etc. The wireless interface 116 may provide wireless download capabilities using Bluetooth™ technology (IEEE 802.11a), wireless LAN (IEEE 802.11a/b/g), cellular, satellite, private and public radio networks, etc. Additionally, the onboard hardware platform 102 is designed in a manner so as to support downloading data from the EDR 104 to any of the local client 114, the remote client 115 and the remote client 118 irrespective of the data format used by the EDR 104.

Figure 7:
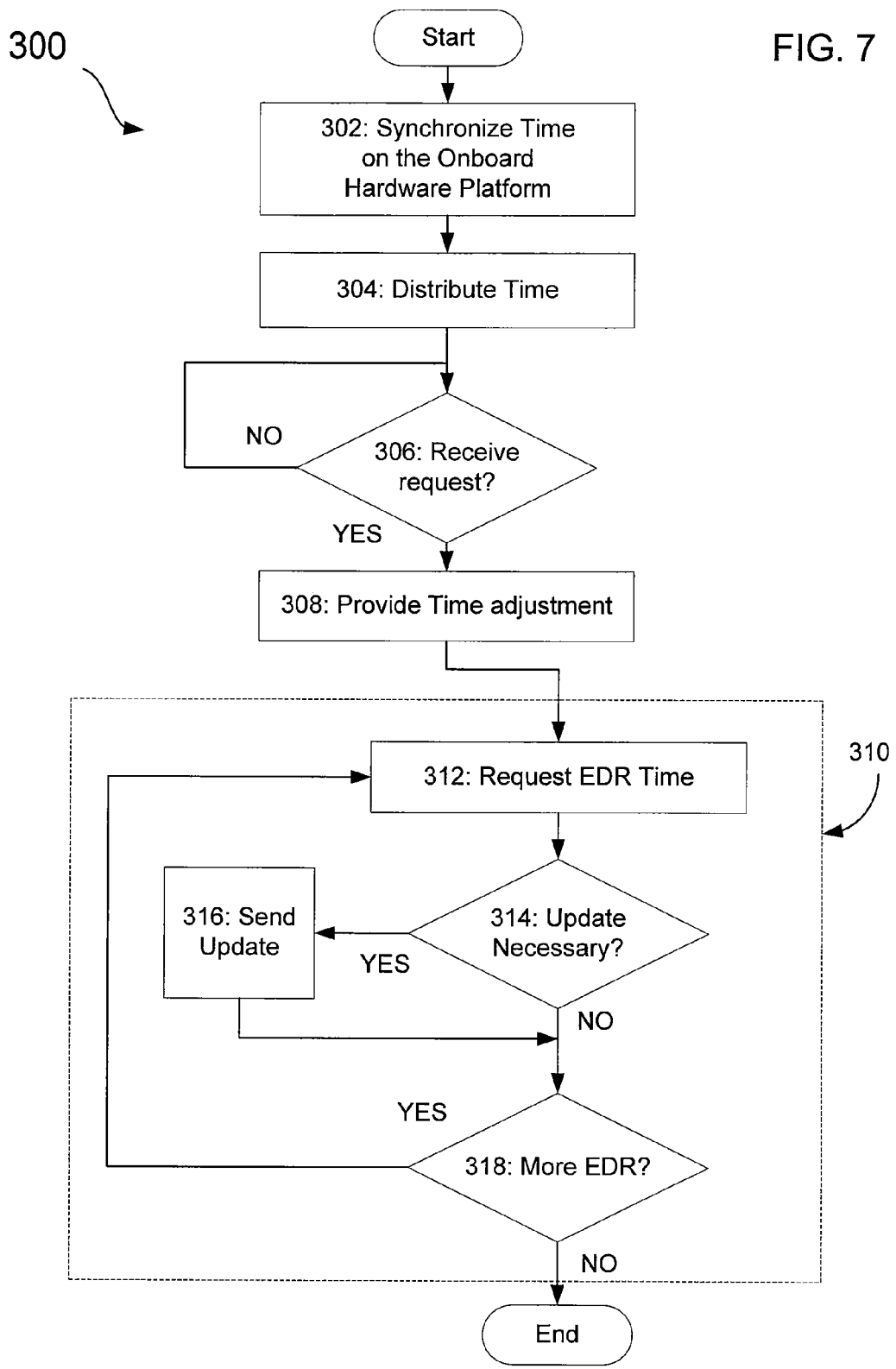
FIG. 7 illustrates a flowchart of a time synchronization program used by the event/data recorder system of FIG. 3.

Whether the data is downloaded to the local client 114 or to the remote client 118, the onboard hardware platform 102 ensures that all downloaded data, regardless of the source, format or download methodology, is properly formatted and time synchronized for playback both in its native format of the EDR 104 and in a format to allow Internet based common viewer capability. FIG. 7 below illustrates a flowchart of a program that may be used by the onboard hardware platform 102 to provide synchronized time across all downloaded data from any EDR.

Figure 4:
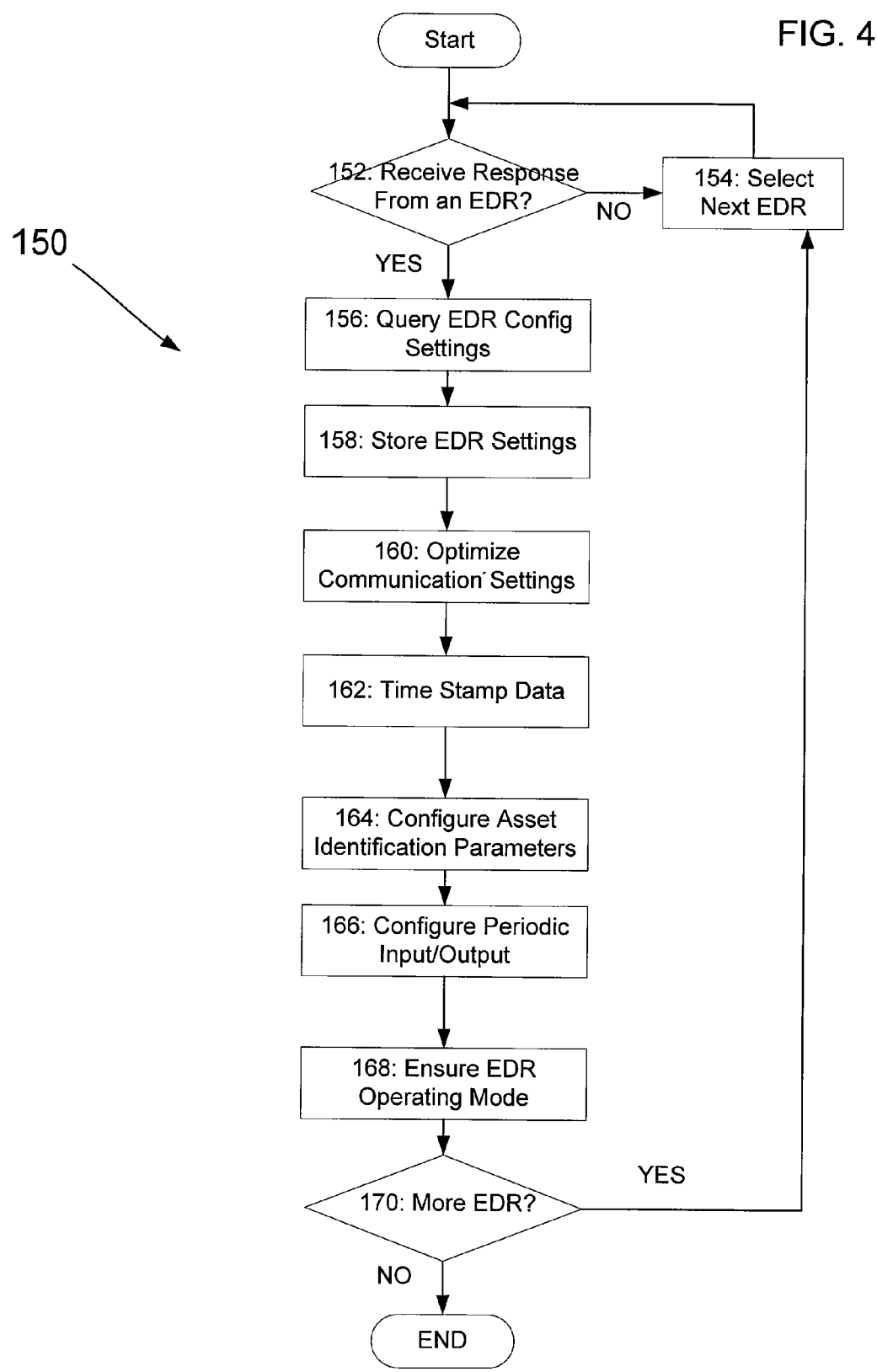
FIG. 4 illustrates a flowchart of a recorder setup program used by the event/data recorder system of FIG. 3.

FIG. 4 illustrates a flowchart of an EDR setup program 150 used by the event/data recorder system 100 of FIG. 3. As illustrated in FIG. 3, to provide a common event/data recorder interface for local or remote event/data downloads, the onboard hardware platform 102 supports the ability for a single wired or wireless connection EDR interface 110 through which event and data downloads can be retrieved from any connected mobile asset sub-system. Event/data downloads from the EDRs may be triggered automatically based on user configurable parameters or on demand. On demand download commands can originate from either the onboard or back office segments of the event/data recorder system 100.

The EDR setup program 150 may be stored on the memory 122 in a manner so that it may be implemented using the processing module 120. At a block 152, the onboard hardware platform 102 may, using the EDR interface 110, attempt to communicate with a connected device, such as the EDR 104, using each of a number of communication protocols/configurations until it gets a response from the EDR 104. The hardware platform 102 continuously attempts to communicate with potential EDRs using the EDR interface 110 and through any other EDR interfaces if available. If at any point the onboard hardware platform 102 receives a response as a result of using one of the communication protocol/configurations, it stores that configuration as applicable to the EDR 104. If no EDR responds to any of the communication protocols/configurations, the onboard hardware platform 102 may determine that no EDR, including EDR 104, is responding at that present moment and store such information in the memory 122. Subsequently a block 154 may select the next EDR to be setup.

If for any selected EDR, the block 152 determines that the EDR supports at least one of the communication protocols, a block 156 may query the configuration settings of such an operational EDR. For example, the block 156 may query the EDR to determine various information identifying that particular EDR including, but not limited to, EDR manufacturer, EDR model number, EDR serial number, EDR event/data logging capacity, settings of the EDR identification parameters, etc. Subsequently, a block 158 may store the configuration settings of the EDR into the memory 122.

The onboard hardware platform 102 may have configuration settings, such as communication speeds, communication protocols, etc., related to a number of EDR models/manufacturers stored on the memory 122. Using such information previously stored on the memory 122, a block 160 may determine the optimal communication settings, such as the data transmission speed, the communication protocol, etc., used to communicate with that particular EDR. The block 160 may also store the optimized configuration settings of the EDR into the memory 122.

Subsequently, a block 162 may time stamp the data to be received from the EDR with the date and time of the onboard hardware platform 102. Time stamping data such date and time parameters of the EDR is important ensure that data received from a number of different EDRs may be analyzed and viewed by an end user in a concurrent and/or proper chronological manner. To ensure proper time stamping of data from each EDR, it may be necessary to synchronize local time of various EDRs. FIG. 7 below illustrates a flowchart of a synchronization program that may be used by the onboard hardware platform 102 to synchronize local time of a plurality of EDRs.

Subsequently, a block 164 may update and configure any asset identification parameters related to the EDR, wherein such parameters may include asset number, asset owner, wheel diameter, wheel sensor type, etc. A block 166 may auto configure any periodic data inputs/outputs required for the EDR. For example, a periodic input to an EDR may be the GPS coordinates of the EDR, while the periodic output from an EDR may be the temperature, pressure level, incremental audio data, etc. Finally, a block 168 may ensure whether the EDR is in its proper operating mode or not. The data and/or information collected by each of the blocks 164-168 may be stored on the memory 122 for subsequent use by the onboard hardware platform 102. Finally, a block 170 may determine if there are any more EDRs to be set-up.

Figure 5:
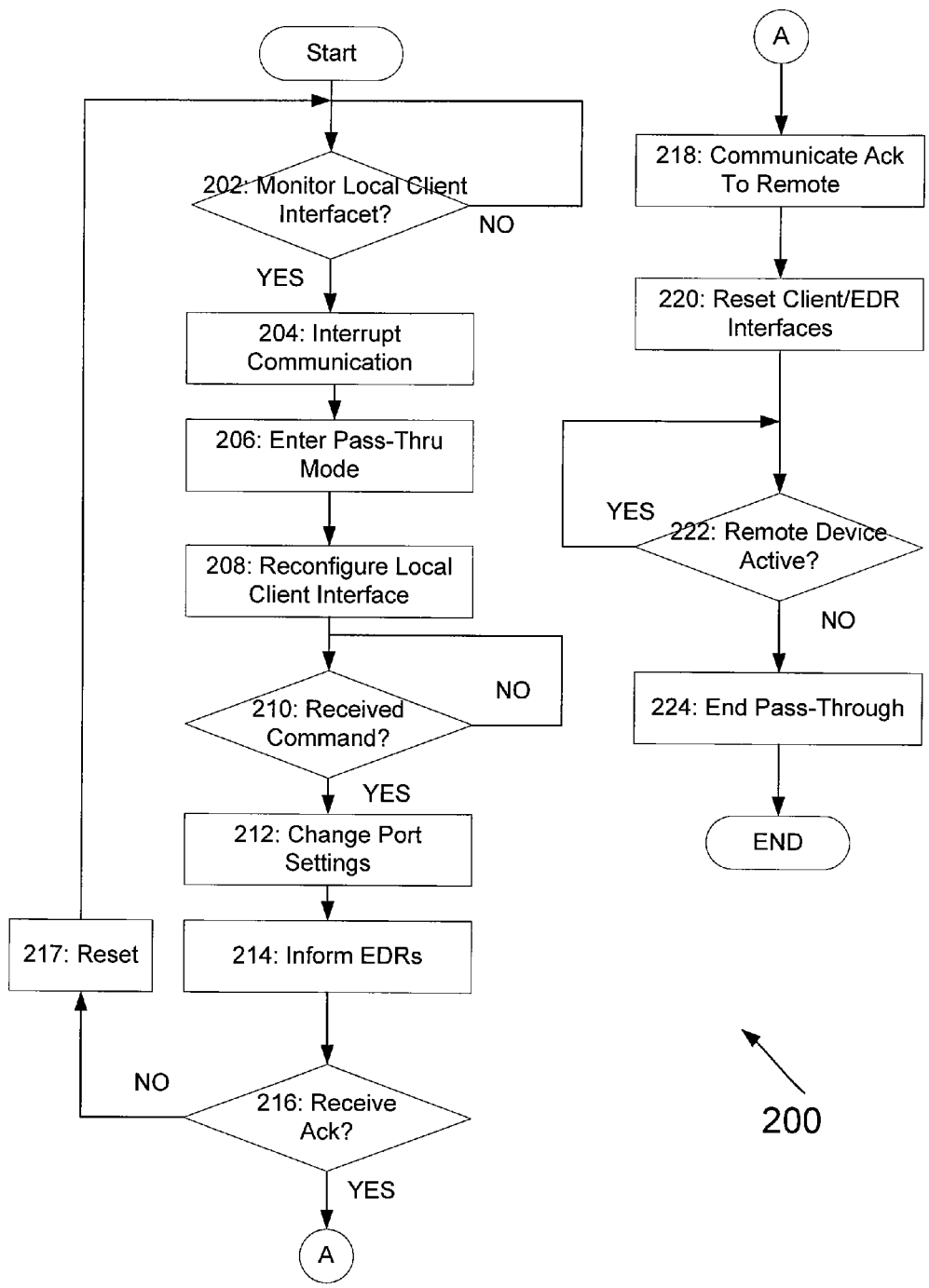
FIG. 5 illustrates a flowchart of a remote download program used by the event/data recorder system of FIG. 3.

FIG. 5 illustrates a flowchart of a download program 200 used by the event/data recorder system 100 of FIG. 3, wherein the download program 200 may be used to download data from one or more of a plurality of EDRs to a local or a remote client such as the local client 114. A block 202 monitors local client interface 112 of the onboard hardware platform 102 for connection of any device, such as any download device capable of downloading data collected from any of the EDRs connected to the onboard hardware platform 102, a monitoring device, other communication devices, etc.

If the block 202 determines that a sequence of download request commands is received at the local client interface 112 from a remote device connected to the local client interface 112, a block 204 interrupts communication of the EDR interface 110 with any EDRs.

A block 206 causes the onboard hardware platform 102 to enter into a pass-through mode in which any commands received from a device connected to the local client interface 112 are forwarded to the appropriate EDRs via the EDR interface 110.

Subsequently, A block 208 causes the onboard hardware platform 102 to change the communication setup of the local client interface 112 so as to support any adaptive changes necessary for the local client interface 112 to function in the pass through mode. For example, during an initial connection of a local client 114 to the local client interface 112, the local client interface 112 may use a typical 19.2K baud, 8 data bits, no parity and 1 stop bit with no hardware handshaking. However, upon initialization of a download session, the local client 114 may dynamically request that the port speed of the local client interface 112 be changed to 57.6K baud using the Xmodem file transfer mechanism.

Subsequently, while in the pass-through mode a block 210 [diamond] monitors or listens to the local client interface 112 for any commands being sent from any local or remote device to any EDR. If any commands are received, a block 212 interprets these commands and, if required, changes the port settings and protocols for the local client interface 112 as well as for the EDR interface 110.

A block 214 also generates and sends appropriate commands to any EDR(s) connected to the local client interface 112 in the pass through mode, so that the EDR(s) may also internally make necessary port configuration changes. Subsequently, a block 216 monitors the EDR(s) for acknowledgement of the change in the port configurations. If no acknowledgement is received, a block 217 resets the local client interface 112 to its original setting and sends a message to the local client 114 that its request to change the port speed cannot be granted. As a response, the local client 114 may change its communication settings accordingly. Subsequently the control is transferred back to block 202.

If an acknowledgement of such port configuration is received from the EDR(s), a block 218 communicates such acknowledgements back to the device requesting the change. However, if no such acknowledgement is received from the EDR(s), a block 220 resets both the local client interface 112 and the EDR interface 110 to their original configurations allowing the local client or the remote client to re-attempt download from the EDR(s).

Finally, a block 222 monitors the local client interface 112 to determine if the local client or the remote client is still active, or that there is any communication received from the local client or the remote client. If no activity is detected, a block 224 resets any port configuration and protocols at the local client interface 112 and at the EDR interface 110 that may have been made to initiate the pass through communication mode between the remote device and the EDR(s), and relinquishes the control of communication with the EDR(s) back to the processing module 120 of the onboard hardware platform 102. Subsequently, the onboard hardware platform 102 may directly communicate with the EDR(s) for downloading data from the EDR(s).

The download program 200 provides a user the capability to use a common point of connection from which the user can perform the task of downloading data from any EDR connected to the onboard hardware platform 102. Any local client or the remote client with any software and hardware can be used to download the data from EDRs as though such remote device were directly connected to the EDRs from which they are retrieving the downloaded data. Note that FIG. 5 illustrates the flowchart for remote download program 200 with respect to the local client 114 and the local client interface 112, the various steps of the download program 200 may be implemented by substituting the local client interface 112 with the wireless interface 116 and the local client 114 with the remote client 118 to provide a wireless version of the download program 200.

Figure 6:
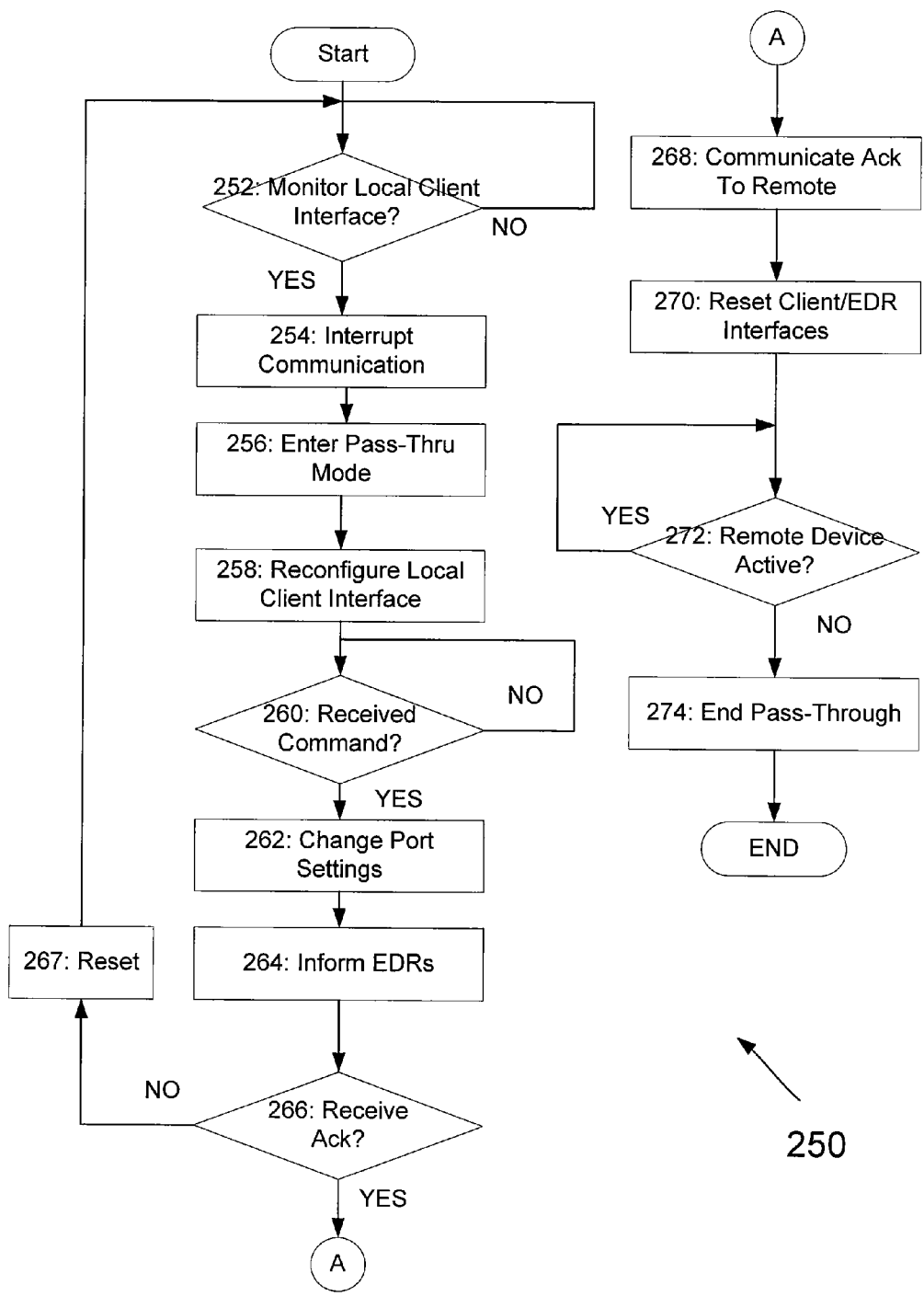
FIG. 6 illustrates a flowchart of a wireless download program used by the event/data recorder system of FIG. 3.

FIG. 6 illustrates a flowchart of such a wireless download program 250 used by the event/data recorder system 100 of FIG. 3. Because various functions of the wireless download program 250 are similar to that of the download program 200, the wireless download program 250 is not described in further detail herein.

FIG. 7 illustrates a flowchart of a time synchronization program 300 used by the event/data recorder system 100 of FIG. 3. The onboard hardware platform 102 may provide synchronized time across all downloaded data from any EDR sources. To accomplish this, the onboard hardware platform 102 may maintain a common system time synchronized through at least one of: (1) a geographical positioning system (GPS) internal to the onboard hardware platform 102; (2) a network time source communicatively connected to the onboard hardware platform 102; and (3) time synchronized from another on-board system. At block 302 may update or synchronize the time on the onboard hardware platform 102 using one of these or other similar sources.

The onboard hardware platform 102 may be set up so as to distribute synchronized time to the EDRs using a predetermined schedule. A block 304 may distribute synchronized time to the EDRs based on such a predetermined schedule. Subsequently, a block 306 determines if there is any request received from any EDRs or from any other onboard hardware platforms to provide the synchronized time, if such a request is received, a block 308 may provide the synchronized time to the requesting source.

Because many EDRs may be designed to generate and keep their internal times, the onboard hardware platform may be used to test the time generated and kept on such EDRs and to update the time if necessary. A module 310 may be implemented to provide such updates to the EDRs' internal times. A block 312 may query an EDR for its internal time. Upon receiving the internal time, a block 314 may compare the received time with the synchronized time stored on the onboard hardware platform 102 to determine if updated time needs to be sent to the EDR.

If the block 314 determines that an update is necessary, a block 316 sends such an update to the EDR, otherwise, block 318 selects the next EDR and control passes back to block 312. Note that module 310 is not always necessary and it may be operational only in some implementations of the onboard hardware platform 102.

As a result of providing synchronized time updates to the EDRs, any files or data received from the EDRs are stamped with correct time stamps. This allows viewing mobile asset downloaded data from multiple onboard EDRs in a synchronized manner using either vendor specific or Internet-based data analysis tools. Thus, operational, video, audio, engine, fuel and diagnostic data from multiple EDRs can be viewed through a single user interface against a common event timeline even when the data was retrieved from multiple onboard systems. A system for viewing and analyzing such data may be provided by the local client, remote client, or at any other node on the network 10 communicatively connected to the event/data recorder system 100.

As one of ordinary skill in the art would know, the order of one or more blocks of the flowcharts 200-300 may be altered and one or more blocks of the flowcharts 200-300 may also be processed in parallel form. Similarly, additional blocks may be added at any point in these flowcharts and each of the blocks of these flowcharts may be implemented as part of various components of event/data recording system 100.

Figure 8:
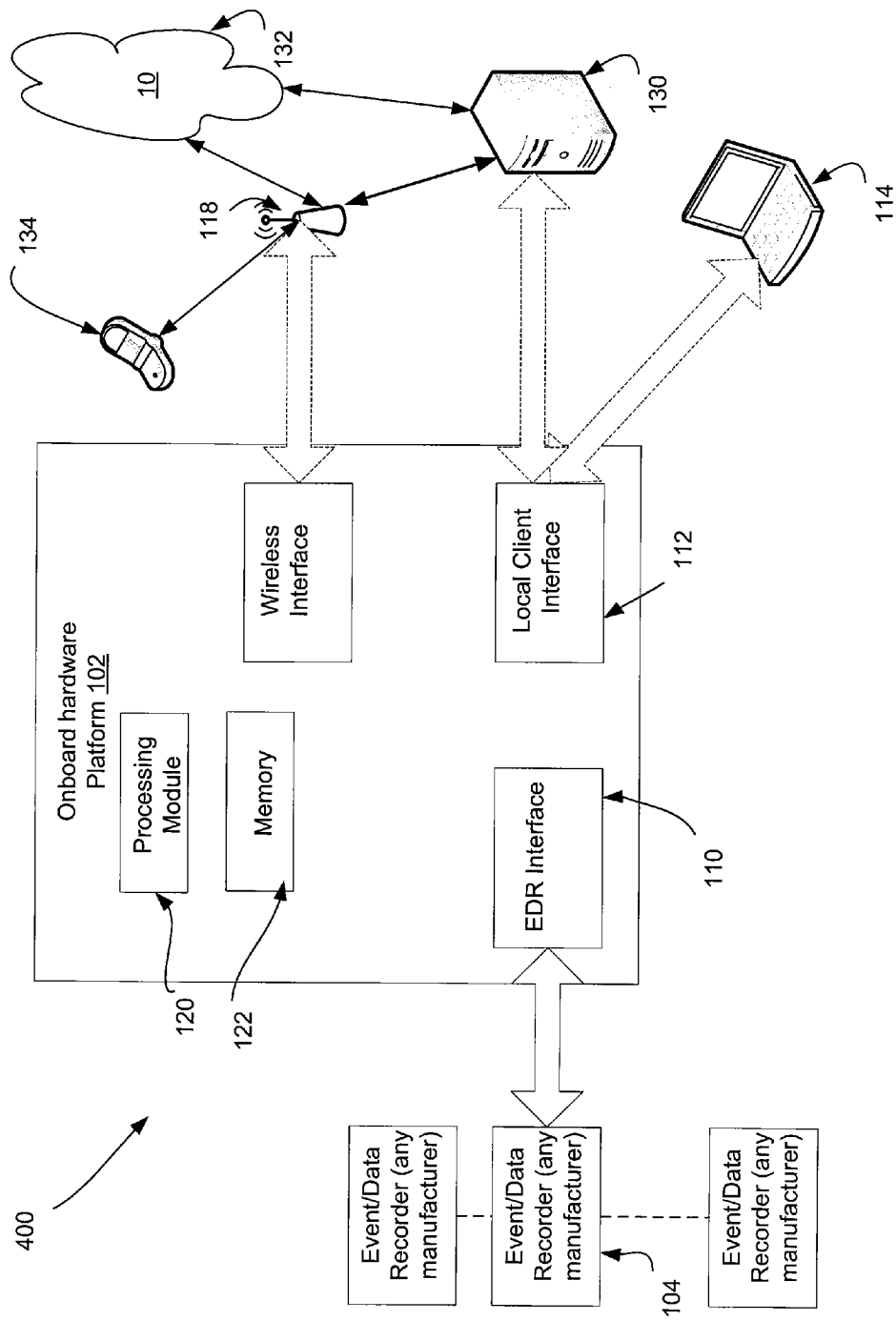
FIG. 8 illustrates a field implementation of the event/data recorder system of FIG. 3.

FIG. 8 illustrates a field implementation 400 of the event/data recorder system 100 of FIG. 3. As it can be seen in FIG. 8, the field implementation 400 includes many components of the event/data recorder system 100 as represented by the like numerals in both systems. The local client interface 112 is further illustrated to be able to communicate simultaneously with multiple computers, such as the local client 114 and a remotely located server 130. As one of ordinary skill in the art would recognize, the local client interface 112 may be adapted to communicate with number of other nodes as well. Similarly, the wireless access point acting as the remote client 118 may be adapted to communicate with the communication network 10, the remote server 130, a wireless phone 134, etc. Moreover, one or more other onboard hardware platforms located on other mobile assets may also be communicatively connected to the server 130, via, for example, the communication network 10. Thus, EDR data from a number of mobile assets may be shared using the implementation of FIG. 8.

The onboard hardware platform 102 may ensure that all data downloaded from the EDRs, regardless of the source, format or download methodology is properly formatted and time synchronized for playback in any one or all of the following: (1) the native format of the EDRs; (2) a customer specified or customized format; and (3) an Internet-based common viewer capability detailed in a later section of this application.

Therefore, various components and communication capabilities of the event/data recorder system 100 as implemented in FIG. 8 can be used to provide a common Internet based viewer capability for viewing data collected from the EDRs. For example, data downloaded from the EDRs either via the local client interface 112 or via the wireless interface 116 may be downloaded in a database in the server 130. One or more data analysis program such as SAS®, Excel®, Access®, etc., may be located on the server 130 or on any alternate location to analyze the data and to present the data using Internet based viewing tools. For example, charts, graphs, videos, etc., generated based on the EDR data stored on the server 130 may be viewed using Internet browsers located on various nodes of the communication network 10. Alternately, the EDR data can also be pushed to various users using really simple syndication (RSS) or other similar technologies. Yet alternatively, alert signals may be generated and communicated to users such as the cellular phone 134, etc.

Various Internet based EDR data viewer(s) may provide reports including, but not limited to, tabular viewing of all EDR data as per various EDR parameters, graphical viewing of all EDR data as per various EDR parameters, user selected configurations of EDR data for user selected parameters, user selected viewing of data based on variables such as time, distance traveled, speeds of operational exceptions, etc., synchronized Internet based viewing of EDR data at certain event, audio, video, etc.

Furthermore, a user may be able to query for specific events or data exceptions using the Internet based or other query tools. Results of such queries, or results of other analysis on the EDR data may be exported to users in formats suitable for common data analysis tools such as spreadsheets and databases. The implementation of the event/data recorder system 100 illustrated in FIG. 8 may allow a user to select for export available data from any EDRs on any of a plurality of mobile assets.

In view of the many possible embodiments to which the principles of this patent may be applied, it should be recognized that the embodiments described herein with respect to the drawing figures are meant to be illustrative only and should not be taken as limiting the scope of patent. For example, for performance reasons one or more components of the method of the present patent may be implemented in hardware, rather than in software. Therefore, the patent as described herein contemplates all such embodiments as may come within the scope of the following claims and equivalents thereof.

What is claimed is:

1. A communication apparatus located on-board a mobile asset, the apparatus comprising:
    a plurality of event/data recorders (EDRs), each EDR operating according to a predetermined communication protocol, certain of said communication protocols differing from other said communication protocols;
    a memory adapted to store said predetermined communication protocols of each of the plurality of event/data recorders;
    a processor adapted to dynamically determine the configuration of an event/data recorder of the plurality of event/data recorders, to select the communication protocol based on the configuration of the event/data recorder, and to configure an EDR interface to communicate with the event/data recorder using the selected communication protocol; and
    the EDR interface adapted to communicate with the event/data recorder using the selected communication protocol.

2. The communication apparatus of claim 1, further comprising a transmitter adapted to transmit data from the event/data recorder to a remote computer.

3. The communication apparatus of claim 2, wherein the transmitter is a wireless transmitter adapted to transmit data to the remote computer in a wireless manner.

4. The communication apparatus of claim 1, further comprising a client interface adapted to communicate data from the event/data recorder to a remote computer and to communicate commands from the remote computer to the EDR interface.

5. The communication apparatus of claim 4, further adapted to:
    receive a request from the remote computer at the client interface to communicate with the event/data recorder using a first communication protocol;
    interrupt communication between the EDR interface and the event/data recorder;
    reconfigure the EDR interface and the client interface to operate in a pass-through mode; and operate the client interface and the EDR interface in the pass-through mode.

6. The communication apparatus of claim 5, further adapted to:
monitor the client interface for any communication from the remote computer; and
discontinue operating the client interface and the EDR interface in the pass-through mode if the remote computer is not active at the client interface.

7. The communication apparatus of claim 6, wherein the client interface is a wireless interface and the remote computer is a wireless transceiver.

8. The communication apparatus of claim 1, wherein the memory includes communication protocols used to communicate using at least one of: (1) RS232 protocol; (2) Ethernet protocol; (3) RS485 protocol; (4) RS422 protocol; (5) controller area network (CAN) protocol; and (6) universal serial bus (USB) protocol.

9. The communication apparatus of claim 1, further adapted to synchronize the time of the communication apparatus to universal time and to communicate the synchronized time to each of the plurality of EDRs.

10. The communication apparatus of claim 1, further adapted to:
synchronize the time of the communication apparatus to universal time;
request local EDR times from each of the plurality of EDRs;
compare local EDR times with the synchronized time; and
send a command to one or more of the plurality of EDRs to adjust their local EDR times to the synchronized time.

11. The communication apparatus of claim 1, wherein the memory is further adapted to store a data processing program to process event data received from the plurality of EDR(s), the data processing program comprising:
a first routine to receive data from the EDR in a format generated by the EDR;
a second routine to convert the data received from the EDR into a format presentable via an Internet browser; and
a third routine to communicate the converted data using the client interface.

12. The communication apparatus of claim 11, wherein the memory is further adapted to store format specifications for data generated by a plurality of EDRs and wherein the second routine uses the format specifications to convert the data received from the EDR.

13. A method of communicating with an event/data recorder (EDR), the method comprising:
determining the configuration of the EDR;
selecting a communication protocol based on the configuration of the EDR;
configuring an EDR interface to communicate with the EDR using the selected communication protocol; and
communicating with the EDR via the EDR interface.

14. The method of claim 13, wherein the EDR is one of a plurality of EDRs, each of the plurality of EDRs communicating using a different communication protocol.

15. The method of claim 13 further comprising:
receiving EDR data from the EDR;
selecting an EDR data format based on the configuration of the EDR;
interpreting the EDR data based on the EDR data format; and
storing the EDR data on a memory of an onboard hardware platform.

16. The method of claim 15, further comprising:
converting the EDR data into a format readable by an Internet browser software; and
communicating the converted EDR data to a remote computer.

17. The method of claim 16, wherein communicating the converted data to a remote computer comprises wirelessly communicating the converted data to a remote computer.

18. The method of claim 17, further comprising:
synchronizing time of the onboard hardware platform with universal time;
receiving the local time on the EDR;
comparing the EDR time with the universal time; and
if the EDR time is different than the universal time, sending a request to the EDR to update its local time.

19. A method of communicating data from an EDR to a remote client using an onboard platform system having an EDR interface communicatively connected to the EDR and a remote client interface communicatively connected to the remote client, the method comprising:
receiving at the remote client interface a request from the remote client for data from the EDR;
dynamically determining the configuration of the EDR and the configuration of the remote client;
selecting a communication protocol based on the configuration of the EDR and the configuration of the remote client;
interrupting any existing communication with the EDR at the EDR interface;
reconfiguring the EDR interface to communicate with the EDR using the selected communication protocol;
reconfiguring the EDR interface and the remote client interface to communicate with each other in a pass-through mode; and
communicating data from the EDR to the remote client using the EDR interface and the remote client interface communicating in the pass-through mode.

20. The method of claim 19, wherein the remote client communicates with the remote client interface in a wireless manner.

21. The method of claim 19 further comprising providing time adjustment to the EDR to adjust the EDR time to universal time.

22. The method of claim 19, wherein communicating data from the EDR to the remote client further comprises converting data from the EDR into a format presentable via an Internet browser using at least one of: (1) a data conversion routine stored on the EDR; and (2) a data conversion routine stored on the remote client.

23. The method of claim 19 further comprising:
monitoring the remote client interface for any communication from the remote client; and
discontinuing the pass-through mode when the remote client is not active at the remote client interface.

* * * * *